United States Patent [19]
Muller et al.

[11] 3,830,210
[45] Aug. 20, 1974

[54] AIR INTAKE SYSTEM WITH TEMPERATURE-CONTROLLED WARM AIR VALVE

[75] Inventors: Heinz Muller, Hochbert; Paul Schonefeld, Ludwigsburg, both of Germany

[73] Assignee: Filterwerk Mann & Hummel GmbH, Ludwigsburg, Germany

[22] Filed: Sept. 21, 1972

[21] Appl. No.: 290,899

[30] Foreign Application Priority Data
Sept. 21, 1971 Germany.......................... 2147027

[52] U.S. Cl. ......................... 123/122 D, 123/122 R
[51] Int. Cl. ............................................ F02m 31/00
[58] Field of Search......... 123/122 D, 122 H, 179 H

[56] References Cited
UNITED STATES PATENTS

| | | | |
|---|---|---|---|
| 1,242,926 | 10/1917 | Donning................... | 123/122 D UX |
| 2,058,204 | 10/1936 | Ball et al...................... | 123/122 H |
| 2,763,252 | 9/1956 | Dolza............................ | 123/122 H |
| 2,821,181 | 1/1958 | Dolza............................ | 123/122 D |
| 3,394,687 | 7/1968 | Scott............................ | 123/122 D X |
| 3,444,847 | 5/1969 | King.............................. | 123/122 D |
| 3,459,163 | 8/1969 | Lewis............................ | 123/122 D |
| 3,563,007 | 2/1971 | Clarke ......................... | 123/122 D X |
| 3,726,512 | 4/1973 | Herwig et al. ............... | 123/122 D X |

*Primary Examiner*—Charles J. Myhre
*Assistant Examiner*—R. H. Lazarus
*Attorney, Agent, or Firm*—Bacon & Thomas

[57] ABSTRACT

An air intake system for carburetion-type internal combustion engines in which a cold air duct and a warm air duct lead via a flap valve to the air filter, the flap valve controlling the relative mixture of a cold air and warm air. A spring-loaded membrane actuator connected to the negative pressure in the engine intake manifold controls the flap valve position. An air temperature responsive relief valve in the air connection reduces the negative air pressure on the membrane actuator when the air temperature reaches a certain value, thereby moving the flap valve to admit less warm air. However, a thermostat-controlled back pressure valve in the same air connection blocks this effect until the engine has reached its operating temperature.

13 Claims, 2 Drawing Figures

PATENTED AUG 20 1974 3,830,210
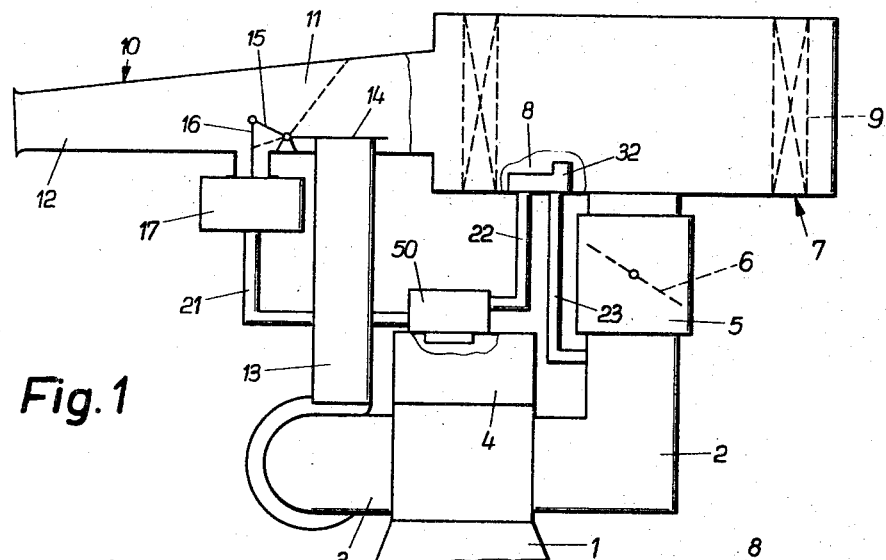
Fig.1
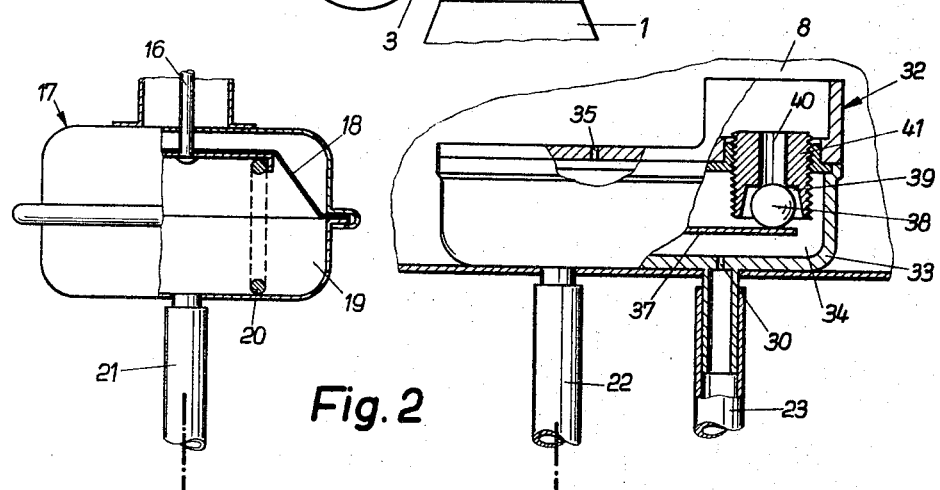
Fig.2
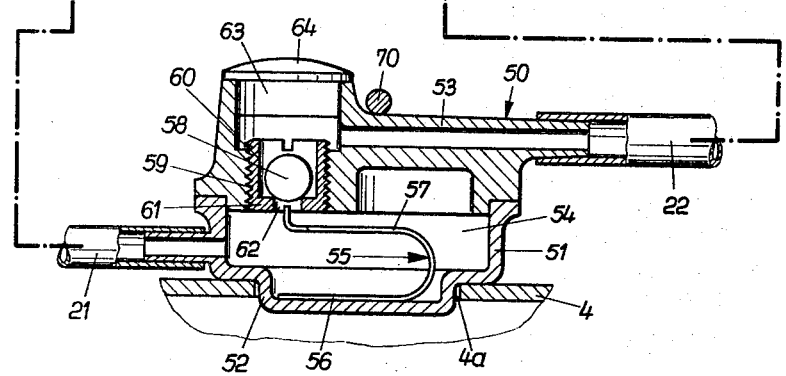

3,830,210

AIR INTAKE SYSTEM WITH TEMPERATURE-CONTROLLED WARM AIR VALVE

BACKGROUND OF THE INVENTION

1. Field of the Invention

The invention relates to air intake systems for carburetion-type internal combustion engines, and in particular to air intake systems which have a temperature-controlled warm air intake through which preheated air is fed to the air intake system, whereby the supply of warm air is controlled automatically in response to the air temperature and negative air pressure in the air intake system.

2. Description of the Prior Art

From the prior art in this field are known several variations of an air intake system which has a warm air duct opening into the raw intake, the warm air duct being closable by means of a vacuum motor operated flap valve. In its normal, spring-urged end position it closes the warm air intake while opening the cold air intake and in its second end position it opens the warm air intake while closing the cold air intake. The pressure space of the vacuum membrane actuator is connected to the air intake downstream of the carburetor throttle via an air connection which includes a calibrated passage. This air connection which transmits the negative pressure from the air intake manifold to the membrane actuator includes a relief valve which is opened by a thermostat at a certain air temperature, thereby eliminating the negative air pressure in the membrane actuator and resetting the latter to its first position. The purpose of such an arrangement is to improve engine operation and to reduce toxic exhaust emissions by improving the carburetion and by accelerating the engine warmup during cold starts.

The above-described prior art solution has the shortcoming of failing to operate properly, when the engine is subjected to full load shortly after a cold start. The negative air pressure in the intake manifold decreases in response to the throttle opening and becomes minimal when the engine is under full load and the throttle is completely open. In this case, the vacuum membrane actuator has insufficient negative pressure on its membrane to maintain the warm air valve open against its resetting spring so that the warm air intake is closed, even though the engine is still running cold. Thus, whenever an internal combustion engine with the proposed prior art air intake system is subjected to full load shortly after a cold start, the accelerated warmup of the engine fails to take place as intended. This condition is detrimental to the longevity of the engine itself and is further undesirable because it increases the emission of toxic exhaust gases into the air.

Other known solutions suggest the control of the warm air valve in direct response to the temperature of the intake air by means of a thermostat arranged in the air intake. In this case, the control means do not respond to flow volume in the air intake manifold. This air intake system feeds only preheated air into the carburetor at cold start and admits progressively more cold air as the intake air becomes warmer regardless of the load and temperature of the engine itself. This solution has the shortcoming that, even with a fully warmed-up engine, the warm air duct will be opened partially at least, whenever the engine is subjected to full load. This means a lower fill coefficient of the cylinders and a corresponding reduction in power output.

Similar shortcomings are found in another prior art solution which suggests an air intake system with two control valves for the intake of warm and/or cold raw air and where the flap valves are operated by means of a linkage in response to a thermostat which measures the water temperature of the engine cooling system. This solution likewise gives inadequate consideration to the operating conditions of the internal combustion engine during cold start at partial and full load versus normal operation at different loads.

SUMMARY OF THE INVENTION

It is a primary objective of the present invention to suggest an improved air intake system for carburetion type internal combustion engines in which the aforementioned prior art shortcomings are eliminated.

The invention proposes to attain the above objective by suggesting the arrangement of a thermostat controlled back pressure valve in the air connection between the membrane actuator of the warm air flap valve and the air intake manifold, in addition to the known thermostat controlled relief valve, whereby, under certain operating conditions, the effect of the relief valve on the membrane actuator is blocked by the back pressure valve.

This arrangement provides a warm air supply to the air intake system even under full load at cold start, as the back pressure valve maintains sufficient negative pressure in the pressure space of the membrane actuator after the negative air pressure in the intake manifold has mostly disappeared as a result of the throttle opening. This negative air pressure in the membrane actuator is then maintained regardless of the air temperature in the intake system until the engine itself reaches a certain temperature, thereby operating the thermostat of the back pressure valve to render it ineffective when the engine is warm.

BRIEF DESCRIPTION OF THE DRAWING

Further special features and advantages of the invention will become apparent from the description following below, when taken together with the accompanying drawing which illustrates, by way of example, an embodiment of the invention represented in the various figures as follows:

FIG. 1 shows in a schematic representation portions of an internal combustion engine with an air intake system embodying the invention; and FIG. 2 shows in enlarged detail the air connection with the relief valve, back pressure valve, and membrane actuator of the air intake system of FIG. 1.

DESCRIPTION OF THE PREFERRED EMBODIMENT

FIG. 1 shows the upper part of an internal combustion engine 1, on the cylinder head of which are mounted an intake manifold 2, an exhaust manifold 3 and a valve cover 4. On the intake manifold 2 is further mounted a carburetor 5 inside which is arranged a throttle 6 whose adjustment controls the supply of fuel-air mixture to the engine. On the carburetor 5 in turn is mounted an air intake filter 7 which includes an annular filter element 9 through which the raw air entering through the air intake 10 has to pass radially inwardly in order to reach the clean air space 8. The air intake 10 includes a raw air duct 11 into which opens from one direction a cold air duct 12 and from another direction a warm air duct 13. The air passing through the warm air duct 13 is preheated by the fact that it is drawn from the vicinity of exhaust manifold 3 of the internal combustion engine 1.

Inside the raw air duct 11 is pivotably arranged a flap valve 14 to which is attached a lever 15 connecting it to the rod 16 of a vacuum membrane actuator 17. This membrane actuator includes a rubber membrane 18 (FIG. 2) which forms a pressure space 19 inside the actuator housing. Membrane 18 is normally held in its extended position corresponding to FIGS. 1 and 2, by means of a resetting spring 20. The pressure space 19 of the membrane actuator communicates with an air connection 21, 22, 23 whose opposite end opens into the intake manifold 2 downstream of the carburetor throttle 6 of the engine. The flap valve 14 is movable by means of the membrane actuator 17 between a first end position as shown in the drawing and a second end position indicated by a broken line. Spring 20 of the membrane actuator 17 tends to maintain flap valve 14 in its first end position in which it closes the warm air duct 13 while opening the cold duct 12 to the air filter 7. The existence of a certain negative pressure inside pressure space 19 below membrane 18 causes the latter to move downwardly so as to lift flap valve 14 in the direction of its second end position. In the second end position it fully opens the warm air duct 13 while closing cold air duct 12.

In the clean air space 8 inside filter element 9 is mounted on the bottom of air filter 7 a relief valve 32 which communicates with the air connections 22 and 23. Air connection 23 opens into a space 34 inside a housing 33 of relief valve 32 via a calibrated throttling passage 30. Another small passage 35 connects the valve space 34 with the clean air space 8 of the air filter 7. The relief valve 32 further includes a valve ball 38 which is biased against a valve seat 39 by a bimetallic thermostat blade 37 as long as the temperature of the relief valve remains below a certain value. The valve seat 39 is part of an adjustable threaded sleeve 41 which provides a passage 40 to clean air space 8 of filter 7. At a predetermined higher temperature, the bimetallic thermostat blade 37 releases the valve ball 38 from valve seat 39 so as to open the relief valve space 34 to the clean air space 8, thereby eliminating the negative pressure which had previously been built up through air connection 23 which connects valve space 34 to intake manifold 2. The small passage 35 serves to slowly renew the air contained inside valve space 34 without eliminating the negative air pressure present therein, so that the thermostat blade 37 is subjected to an air temperature which corresponds substantially to that being ambient inside clean air space 8. The calibrated throttling passage 30 in air connection 23 serves the purpose of dampening the transmission of any rapid changes in negative air pressure from air intake manifold 2.

The invention further suggests a back pressure valve 50 between air connections 22 and 21, which latter opens into pressure space 19 of membrane actuator 17. As can be seen from FIG. 2, the back pressure valve 50 has a two-part housing which is so arranged that the lower housing part 51 provides a seat 52 which engages a matching opening 4a in the valve cover 4 of internal combustion engine 1. This lower housing part 51 is preferably injection molded of a material which has good heat conductivity, for example aluminum. The upper housing part 53, which may be made of plastic, and the lower housing part 51 form a valve space 54 which communicates with pressure space 19 of membrane actuator 17 via air connection 21. Inside valve space 54 is further arranged in a U-shaped bimetallic thermostat blade 55 whose lower leg 56 forms an intimate contact with the bottom of the lower housing part 51 so as to provide good heat sensing. The upper leg 57 of thermostat blade 55 includes an upwardly extending end portion which faces a valve ball 58 which, at temperatures below enging operating temperature, closes a passage 62 by resting on a valve seat 61. Passage 62 and valve seat 61 are part of an adjustable threaded sleeve 60. The space 63 above valve ball 58 communicates with relief valve 32 via air connection 22. A removable plug 64 provides access to the valve sleeve 60 for adjustment. A wire retainer shown at 70 holds the back pressure valve 50 against the opening 4a in valve cover 4.

During operation, the internal combustion engine 1 creates a negative air pressure in the air intake system, which is greatest inside intake manifold 2 and smallest inside the raw air duct 12. The negative air pressure of intake manifold 2 is transmitted to the pressure space 19 of the pneumatic membrane actuator 17 via air connections 23, 22, and 21, whereby valve ball 58 of the back pressure valve 50 is lifted against its weight as long as air flows from pressure space 19 towards intake manifold 2. The negative air pressure present below membrane 18 being lower than the negative air pressure inside raw air duct 12, a pressure differential is created on membrane 18, causing the latter to move downwardly against resetting spring 20, thereby pivoting flap valve 14 from its first end position in which it closes the warm air duct 13 in the direction of its second position in which the warm air duct 13 is fully opened and the cold air duct 11 is closed. The equilibrium position between the pressure differential acting on membrane 18 and the resetting force of spring 20 determines the intermediate position in which flap valve 14 will come to rest. The influence of passage 35 in the relief valve 32 is negligible as far as the pressure differential on membrane 18 is concerned. However, the opening of the relief valve 32 itself, when the bimetallic thermostat blade 37 bends downwardly under increased air temperature, is sufficient to equalize the air pressure inside valve space 34 with the air pressure inside filter 7, thereby partially or entirely eliminating the negative air pressure transmitted from intake manifold 2. The above-mentioned effect would normally eliminate the pressure differential on membrane 18 of the membrane actuator 17, closing the flap valve 14 against the warm air duct 13, were it not for the action of the back pressure valve 50 which maintains the maximum negative pressure established inside pressure space 19 as long as the valve cover 4 of the internal combustion engine is still cold. Thus, even when the relief valve is opened in response to a rise in the intake air temperature, or when the negative air pressure inside air intake manifold 2 is minimal as a result of full-load operation with fully oepn throttle 6, the warm air duct is maintained open until the engine itself is fully warmed up, in which case the thermostat blade 57 of the back pressure valve 50 expands to lift the valve ball 58 from its seat 59 thereby inactivating the back pressure valve 50. Consequently, the back pressure valve 50 is without effect on the air intake system, as soon as, and as long as the internal combustion engine is in a state of normal operating temperature.

During cold start of the internal combustion engine 1, the bimetallic thermostat blade 37 of relief valve 32 presses valve ball 38 against valve seat 39, in which case bore 40 of threaded sleeve 41, which links the clean air space 8 of filter 7 with the air space 34 of valve housing 33, is closed. However, as long as the engine itself is still cold, the valve ball 58 of back pressure valve 50 remains on its seat 61, thereby allowing only increases in negative air pressure inside pressure space 19 of membrane actuator 17 to take place, while corresponding decreases are blocked.

In practically all cases of cold start operation there are moments when the throttle 6 of carburetor 5 is virtually closed, at least for short periods of time, in which case the negative air pressure inside intake manifold 2 reaches a maximum value. This high negative air pressure is transmitted to the membrane actuator 17 which responds by fully pivoting the flap valve 14 into its second end position (dotted line in FIG. 1) thereby closing the cold air duct 11 and fully opening the warm air duct 13. Once established, this second end position is maintained until the back pressure valve is opened in response to a rise in the engine temperature. Thus, the opening of carburetor throttle 6 during warmup operation, through diminishing the negative air pressure inside intake manifold 2 and air connections 22 and 23, cannot similarly reduce the negative pressure inside air connection 21 and pressure space 19 of the membrane actuator 17 which are located beyond the back pressure valve 50. This relative rise in pressure inside air connection 22 and air space 63 of back pressure valve 50 merely presses the valve ball 58 against its seat 61. Hence, even when operated under full load after cold start, the air intake system of the invention maintains the cold air duct substantially closed, admitting preheated air through warm air duct 13 into the air filter 7 and carburetor 5. This assures an accelerated engine warmup regardless of engine load conditions. Only a heat buildup inside valve cover 4 in response to a general rise in engine temperature permits the return of the warm air flap valve 14 to its first end position, or to an intermediate position in response to the intake air temperature inside clean air space 8 of filter 7, as sensed by thermostat blade 37 of relief valve 32.

In the absence of back pressure valve 50 between air connections 21 and 22, a full-load operation of the engine would correspond to the full-load operating conditions of prior art devices, under which the warm air duct 14 closes again regardless of actual engine operating temperature. This is so because, with a fully opened throttle 6, the negative air pressure inside intake manifold 2 is so small that the resetting spring 20 inside membrane actuator 17 would overcome the inadequate pressure differential acting on membrane 18 and close flap valve 14 against warm air duct 13. A full-load operation after cold start would thus nullify the purpose of the air intake system which is to achieve an accelerated engine warmup.

In the air intake system of the invention, the above-described cold air intake under full-load warmup operation is eliminated through the action of the back pressure valve 50. However, with the engine fully warmed up, it is no longer desirable to admit preheated air into the air intake system, because such preheated air reduces the fill coefficient and the power output of the engine at full load. The invention therefore suggests that the one-way checking effect of the back pressure valve 50 is eliminated at normal operating temperatures so that, when the negative air pressure inside intake manifold 2 drops under full-load operation, the membrane actuator 17 is reset to its first end position and only cold air is admitted through intake duct 11 into the filter 7 and carburetor 5. This cold air improves the engine fill coefficient and its power output.

The operation of the relief valve 32 in response to the air temperature inside the clean air space 8 of air filter 7 is known from similar prior art devices. A small air flow from clean air space 8 through passage 35 into valve space 34, and via air connection 23 into the intake manifold 2 permits the sensing of the actual intake air temperature by the bimetallic thermostat blade 37. A rise in this air temperature beyond a predetermined value causes blade 37 to bend downwardly, thereby releasing valve ball 38 from its seat 39 and admitting air from clean air space 8 through bore 40 into the air connections 22 and 23. This admission of clean air into the air connection reduces the negative air pressure present therein and, assuming the back pressure valve to be inactivated as a result of normal engine operating temperature, the negative air pressure inside air connection 21 and pressure space 19 is likewise reduced. The lessened pressure differential on membrane 18 then allows the resetting spring 20 to move rod 16 and lever 15 upwardly and to pivot the flap valve 14 accordingly so as to admit less warm air from warm air duct 13 and more cold air from cold air duct 12. The membrane actuator thus moves the warm air flap valve 14 to an intermediate position in which a balance is established between the intake of hot air and cold air, this balance being adjustable on the threaded valve sleeve 41 of relief valve 32.

It is of course also possible to arrange the back pressure valve 50 so as to be responsive to the temperature of the water in the engine cooling system rather than to the temperature of the engine valve cover. Alternatively, it could also be arranged to respond to the temperature of the exhaust system, or to the air temperature of an air cooling system. Furthermore, it is possible to arrange the thermostat of the back pressure valve in such a way that it senses the temperature of mixture of the warm and cold air passing through the air intake system itself.

What is claimed is:

1. An air intake system for carburation-type combustion engines comprising in combination:

an air intake duct through which the combustion air is drawn into the engine intake via the carburetor;

a cold air duct leading from the outside into the air intake duct;

a warm air duct also leading from the outside into the air intake duct and including a means for preheating the air which is drawn through it;

valve means for adjustably closing the cold air duct and correspondingly opening the warm air duct so as to permit an adjustment of the relative quantities of cold air and warm air admitted into the air intake duct to obtain an adjustment of the intake air temperature;

means for controlling the adjustment position of said valve means in response to the intake air temperature;

means for checking the valve position controlling means so as to allow only one-way adjustment of the valve means in the direction of closing of the cold air duct during warmup operation of the engine; and means for inactivating said checking means after warmup by establishing two-way adjustability of the valve means, when a predetermined engine operating temperature is reached or exceeded.

2. An air intake system as defined in claim 1, wherein:
said predetermined engine operating temperature is the temperature of the engine valve cover.

3. An air intake system as defined in claim 1, wherein:
said predetermined engine operating temperature is the temperature of the cooling water in the cooling system of the engine.

4. An air intake system as defined in claim 1, wherein:
said predetermined engine operating temperature is the temperature of the cooling air in the cooling system of the engine.

5. An air intake system as defined in claim 1, wherein:
said predetermined engine operating temperature is the intake air temperature.

6. An air intake system as defined in claim 1, wherein said valve position controlling means includes:
means for driving the valve means in response to the engine load as reflected by the negative pressure inside the engine intake duct downstream of the carburetor, whereby the cold air duct is progressively reopened with increasing engine load.

7. An air intake system as defined in claim 6, wherein:
the valve means is of the flap valve type which is pivotable between a first end position in which the cold air duct is open and the warm air duct is substantially closed, and a second end position in which the cold air duct is substantially closed and the warm air duct is open;
the valve driving means includes a membrane actuator connected to the flap valve, a resetting spring biasing the flap valve toward its first end position, and an air connection to the engine intake downstream of the carburetor transmitting the negative intake pressure to the membrane actuator in opposition to the resetting spring; and
the valve controlling means is a temperature controlled pressure relief valve which adjustably opens said air connection to the outside in response to a rising intake air temperature so as to reduce the negative pressure therein.

8. An air intake system as defined in claim 7, wherein:
said checking means is a back pressure valve arranged in said air connection between the pressure relief valve and the membrane actuator; the back pressure valve having a movable valve element which is biased closed in such a way as to permit air to flow away from the membrane actuator, but not toward it; and
the means for inactivating the checking means is a thermostatically controlled member opening the movable valve element against its closing bias, when the predetermined engine operating temperature is reached or exceeded.

9. An air intake system as defined in claim 8, wherein:
the inactivating means of the back pressure valve is a bimetallic member sensing the temperature of the engine valve cover.

10. An air intake system as defined in claim 8, wherein:
the inactivating means of the back pressure valve is a bimetallic member sensing the temperature of the cooling water in the cooling system of the engine.

11. An air intake system as define in claim 8, wherein:
the inactivating means of the back pressure valve is a bimetallic member sensing the temperature of the cooling air in the cooling system of the engine.

12. An air intake system as defined in claim 8, wherein:
the inactivating means of the back pressure valve is a bimetallic member sensing the temperature of the intake air in the air intake duct.

13. A temperature controlled back pressure valve adapted for use in conjunction with an air intake system for carburation-type internal combustion engines having a vacuum motor controlled warm air admitting valve, where said back pressure valve serves to check the vacuum motor operation so as to allow only one-way adjustments thereof in the direction of increasing the intake of warm air during engine warmup, the back pressure valve comprising:
a valve housing having a first and second air space communicating via an air passage, the first air space being connectable to the vacuum motor and the second air space being connectable to the engine intake downstream of the carburetor;
a valve seat in said air passage;
a closure member cooperating with the valve seat, the closure member moving toward the second air space when opening, while being biased toward the valve seat so as to allow only oneway air flow from the first air space into the second air space; and
means for inactivating the back pressure valve after engine warmup, by establishing an open communication between the two air spaces, when a predetermined engine operating temperature is reached or exceeded.

* * * * *